(12) United States Patent
Kim et al.

(10) Patent No.: US 8,055,244 B2
(45) Date of Patent: Nov. 8, 2011

(54) METHOD FOR ALLOCATING ELECTRONIC SERIAL NUMBER FOR MOBILE STATION

(75) Inventors: Ki Jun Kim, Seoul (KR); Young Jun Kim, Gyeonggi-do (KR); Chan Ho Kyung, Gyeonggi-do (KR); Jong Hoe An, Seoul (KR); Sang Gook Kim, San Diego, CA (US); Byung Kwan Yi, San Diego, CA (US)

(73) Assignee: LG Electronics Inc., Seoul (KR)

( * ) Notice: Subject to any disclaimer, the term of this patent is extended or adjusted under 35 U.S.C. 154(b) by 727 days.

(21) Appl. No.: 11/571,820

(22) PCT Filed: Jul. 8, 2005

(86) PCT No.: PCT/KR2005/002209
§ 371 (c)(1),
(2), (4) Date: Sep. 11, 2008

(87) PCT Pub. No.: WO2006/006806
PCT Pub. Date: Jan. 19, 2006

(65) Prior Publication Data
US 2008/0318581 A1 Dec. 25, 2008

(30) Foreign Application Priority Data

Jul. 8, 2004 (KR) .................. 10-2004-0053138
Feb. 3, 2005 (KR) .................. 10-2005-0010206
Feb. 17, 2005 (KR) .................. 10-2005-0013309

(51) Int. Cl.
*H04M 3/42* (2006.01)
(52) U.S. Cl. .................. 455/414.1; 455/446; 455/435.1; 455/551

(58) Field of Classification Search ............... 455/414.1, 455/418, 419, 420, 410, 411, 450, 451, 452.1, 455/515; 370/329, 330, 465, 349, 312
See application file for complete search history.

(56) References Cited

U.S. PATENT DOCUMENTS

| | | | |
|---|---|---|---|
| 5,535,436 A * | 7/1996 | Yoshida et al. ............... | 455/551 |
| 6,374,122 B1 * | 4/2002 | Leung ............................ | 455/551 |
| 6,393,298 B1 * | 5/2002 | Fulton .......................... | 455/551 |
| 6,697,637 B1 * | 2/2004 | Willey ......................... | 455/551 |
| 2003/0092436 A1 * | 5/2003 | Boivin ......................... | 455/419 |
| 2004/0037250 A1 * | 2/2004 | Refai ............................ | 370/335 |
| 2004/0259596 A1 * | 12/2004 | Rajkotia et al. ............... | 455/561 |
| 2005/0025082 A1 * | 2/2005 | Jang et al. ..................... | 370/312 |

(Continued)

FOREIGN PATENT DOCUMENTS

CN 1294792 5/2001

(Continued)

*Primary Examiner* — Jean Gelin
(74) *Attorney, Agent, or Firm* — Lee, Hong, Degerman, Kang & Waimey

(57) ABSTRACT

A method of allocating a mobile station unique number and method of configuring a public long code mask (PLCM) using the same are disclosed, which are suitable for a normal operation between the mobile station and the system. The present invention includes the steps of re-allocating a manufacturer code of the mobile station unique number to a mobile station and transmitting to the mobile station re-allocation type (RECYCLED_TYPE) information indicating how many times the re-allocating step is carried out. Accordingly, the present invention enables allocation of additional ESN without collision with PLCM even if ESN is exhausted.

16 Claims, 2 Drawing Sheets

```
31              24 23                                        0
┌─────────────────────┬────────────────────────────────────────┐
│Manufacturer code(8 bits)│ Manufacturer code serial number(24 bits)│
└─────────────────────┴────────────────────────────────────────┘
```

U.S. PATENT DOCUMENTS

| | | | |
|---|---|---|---|
| 2005/0090276 A1* | 4/2005 | Rajkotia | 455/515 |
| 2006/0154646 A1* | 7/2006 | Tung | 455/411 |
| 2007/0025350 A1* | 2/2007 | Kyung et al. | 370/390 |
| 2008/0126209 A1* | 5/2008 | Wong et al. | 705/14 |

FOREIGN PATENT DOCUMENTS

| | | |
|---|---|---|
| CN | 1300510 | 6/2001 |
| KR | 10-2002-0074314 | 9/2002 |
| KR | 10-2003-0071239 | 9/2003 |
| WO | 99/59361 | 11/1999 |
| WO | WO 99/59361 | 11/1999 |
| WO | WO 02/09466 | 1/2002 |
| WO | 2004/107796 | 12/2004 |

\* cited by examiner

FIG. 4

| P41 ... P37 | P36 ... P32 | P31 ... P0 |
|---|---|---|
| 11000 | P36~P32 | Permuted ESN |

FIG. 5

| MSID_TYPE | ESN |
|---|---|

METHOD FOR ALLOCATING ELECTRONIC SERIAL NUMBER FOR MOBILE STATION

TECHNICAL FIELD

The present invention relates to a mobile communication system, and more particularly, to a method of allocating a unique number of a mobile station and method of configuring a public long code mask (PLCM) using the same. Although the present invention is suitable for a wide scope of applications, it is particularly suitable for a normal operation between the mobile station and the system.

BACKGROUND ART

Generally, an electronic serial number (hereinafter abbreviated ESN) is used in identifying a specific mobile station in the cdma2000 system and mobile stations.

FIG. 1 is a structural diagram of an electronic serial number (hereinafter abbreviated ESN) having a 32-bit length.

Referring to FIG. 1, an ESN of a mobile station consists of an upper 8-bit manufacturer code and a lower 24-bit serial number. The 8-bit part is a code uniquely allocated to each mobile station manufacturer by TIA (telecommunication industry association) authorized by FCC (Federal Communications Commission). And, the serial number part corresponds to a code granted to each mobile station by the corresponding mobile station manufacturer.

And, the ESN is used for user authentication and public long code mask (hereinafter abbreviated PLCM) generation in a mobile communication system and mobile station.

FIG. 2 is a structural diagram of a PLCM generated using an ESN.

Referring to FIG. 2, a PLCM has a 42-bit length. Upper 10-bits of the PLCM are set to a value to avoid collision with a different public long code mask, whereas lower 32-bits are set to a permutated ESN.

Meanwhile, a unique number called a user identification Module ID (hereinafter abbreviated 'UIM_ID) is allocated to an R-UIM (removable user identity module). The UIM_ID has a 32-bit length. The UIM_ID is allocated within a range not overlapped with the ESN in an area where the TIA authorized by the FCC allocated the ESN.

It the R-UIM is allocated to a mobile communication terminal, a bit called a UIM_ID usage indicator is set to '1' and UIM_ID can be provided to the position used by the ESN. Hence, in case of a mobile station to which a R-UIM is allocated, the PLCM shown in FIG. 2 includes a Permutated-UIM_ID in the lower 32-bits instead of a Permutated-ESN.

However, as the mobile communication industry expands, the demand for mobile communication terminals rises and the number of manufacturers of the mobile communication terminals increases. Hence, the ESN and UIM_ID are on the verge of being exhausted. If the ESN and UIM_ID are exhausted, collision occurs in the PLCM generated using the ESN or UIM_ID. In case that the collision occurs in the PLCM, capacity is considerably reduced as well as a problem of crosstalk may take place.

DISCLOSURE OF THE INVENTION

Accordingly, the present invention is directed to a method of allocating a unique number of a mobile station that substantially obviates one or more of the problems due to limitations and disadvantages of the related art. An object of the present invention is to provide a method of allocating a unique number of a mobile station and method of configuring a public long code mask (PLCM) using the same, by which a normal operation is enabled between the mobile station and the system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of allocating a mobile station unique number according to the present invention includes the steps of re-allocating a manufacturer code of the mobile station unique number to a mobile station and transmitting to the mobile station re-allocation type (RECYCLED_TYPE) information indicating how many times the re-allocating step is carried out.

Preferably, the mobile station generates a public long code mask (PLCM) using the re-allocated mobile station unique number and the re-allocation type.

Preferably, the mobile station unique number is either an electronic serial number (ESN) or a user identification module ID (UIM_ID).

Preferably, the re-allocation type has one fixed value. The mobile station stores a station class mark corresponding to the re-allocation type and a 5-bit part of a public long code mask (PLCM) in a form of a table.

To further achieve these and other advantages and in accordance with the purpose of the present invention, a method of operating a mobile station unique number includes the steps of re-allocating a manufacturer code of the mobile station unique number to a mobile station, notifying to the mobile station a re-allocation type (RECYCLED_TYPE) indicating how many times the re-allocating step is carried out, and determining a value of a station class mark (hereinafter abbreviated SCM) for storing the mobile station according to the re-allocation type (RECYCLED_TYPE).

Preferably, the mobile station stores information indicating whether the mobile station itself implements a re-allocated mobile station unique number and re-allocation type (RECYCLED_TYPE) information in a permanent memory.

Preferably, the method further includes the step of notifying a base station of the station class mark (SCMp) including information indicating whether the mobile station itself implements a re-allocated mobile station unique number and re-allocation type (RECYCLED_TYPE) information.

To further achieve these and other advantages and in accordance with the purpose of the present invention, in a wireless system for transmitting a plurality of messages via a downlink common signaling channel, a method of operating a mobile station unique number includes the steps of notifying to a mobile station that a base station itself has implemented a re-allocation unique number and a re-allocation type (RECYCLED_TYPE) by setting an MSG_ID of a message informing a channel assignment or information to a reserved MSG_ID and generating a public long code mask (PLCM) from the mobile station by checking the MSG_ID.

Preferably, the message is either an ECAM, GHDM or UHDM. Preferably, if the MSG_ID is set to the reserved MSG_ID which was not previously used, the mobile station sets a 5-bit part of the public long code mask (PLCM) to a value within a mapping table determined according to the re-allocation type (RECYCLED_TYPE).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a structural diagram of a PLCM generated using a mapping relation between an SCM, reallocation type and PLCM shown in Table 7, Table 9 and Table 11, respectively according to one embodiment of the present invention; and FIG. 5 is a structural diagram of a mobile station identifier (MSID) generated using an SCM and ESN.

BEST MODE FOR CARRYING OUT THE INVENTION

Reference will now be made in detail to the preferred embodiments of the present invention, examples of which are illustrated in the accompanying drawings.

First of all, the present invention is implemented in the cdma2000 system and mobile stations. Furthermore, the present invention is applicable to the wireless communications system operating according to another standard.

Figure 1:
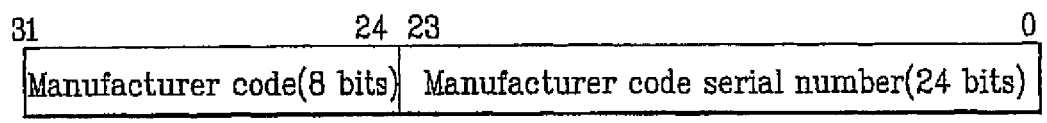
FIG. 1 is a structural diagram of an electronic serial number (hereinafter abbreviated ESN) having a 32-hit length.
Figure 2:
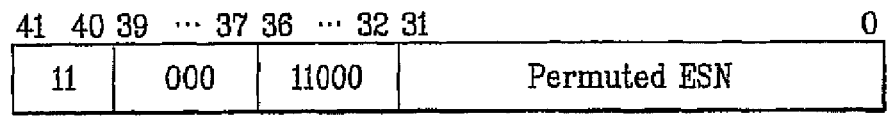
FIG. 2 is a structural diagram of a PLCM generated using an ESN.
Figure 3:
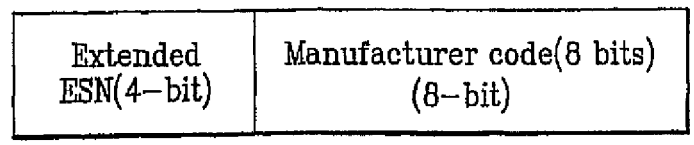
FIG. 3 is a structural diagram of an ESN having an extended code appended thereto according to one embodiment of the present invention.

FIG. 3 is a structural diagram of an ESN having an extended code appended thereto according to one embodiment of the present invention.

Referring to FIG. 3, a field having a prescribed length is appended to a conventional ESN or UIM_ID. In this case, an extended code can be appended to a part above a manufacturer code. And, a PLCM (public long code mask) can be generated using the ESN to which the extended code is appended. For this, according to an extended 4-bit code value, a table, which maps a 5-bit part of a 42-bit PLCM to a value not colliding with all kinds of currently usable long code masks, is used. Namely, according to the extended 4-bit code value, the present invention searches 5-bit patterns to generate the PLCM for a pattern that is not currently used and then uses the corresponding pattern.

Table 1 and Table 2 show examples of mapping relations between an extended code and a PLCM configuration bit in case of using an extended 4-bit code, respectively.

TABLE 1

| Extended ESN | P36~P32 |
|---|---|
| 0000 | 10111 |
| 0001 | 10110 |
| 0010 | 10101 |
| 0011 | 10100 |
| 0100 | 10011 |
| 0101 | 10010 |
| 0110 | 10001 |
| 0111 | 10000 |
| 1000 | 01111 |
| 1001 | 01110 |
| 1010 | 01101 |

TABLE 1-continued

| Extended ESN | P36~P32 |
|---|---|
| 1011 | 01100 |
| 1100 | 01011 |
| 1101 | 01010 |
| 1110 | 01001 |
| 1111 | 01000 |

TABLE 2

| Extended ESN | P36~P32 |
|---|---|
| 0000 | 01000 |
| 0001 | 01001 |
| 0010 | 01010 |
| 0011 | 01011 |
| 0100 | 01100 |
| 0101 | 91191 |
| 0110 | 01110 |
| 0111 | 01111 |
| 1000 | 10000 |
| 1001 | 10001 |
| 1010 | 10010 |
| 1011 | 10011 |
| 1100 | 10100 |
| 1101 | 10101 |
| 1110 | 10110 |
| 1111 | 10111 |

Thus, after the extended code value has been determined to prepare for the case that the ESN is exhausted, the determined code value is used in generating the PLCM so that additional ESNs and PLCMs can be generated 16 ($2^4$) times more than that of the related art.

Moreover, the present invention provides a signaling method to recognize and use an extended code value. For this, each mobile station needs to store the extended code value and is capable of reporting the extended code value according to a request from a base station. And, the extended code value is reported via a status response message (hereinafter abbreviated 'STRPM) or an extended status response message (hereinafter abbreviated 'STRPM') in response to a status request message (hereinafter abbreviated 'STRQM') of a base station.

Table 3 shows an example of STRQM for reporting an extended code value from a mobile station.

TABLE 3

| Field | Length (bits) |
|---|---|
| Reserved | 4 |
| QUAL_INFO_TYPE | 8 |
| QUAL_INFO_LEN | 3 |
| Type-specific fields | 8 × QUAL_INFO_LEN |
| NUM_FIELDS | 4 |

NUM_FIELDS occurrences of the following field:

| {NUM_FIELDS} |   |
|---|---|
| RECORDED_TYPE | 8 |
| }(NUM_FIELDS) |   |

Meanwhile, Table 4 shows an example of STRPM for reporting an extended code value from a mobile station.

TABLE 4

| Field | Length (bits) |
|---|---|
| QUAL_INFO_TYPE | 8 |
| QUAL_INFO_LEN | 3 |
| Type-specific fields | 8 × QUAL_INFO_LEN |

One or more occurrences of the following record:

| { |   |
|---|---|
| RECORDED_TYPE | 8 |
| RECORD_LEN | 8 |
| Type_specific_fields | 8 × RECORDED_LEN |
| } |   |

Table 5 shows an example of ESTRPM for reporting an extended code value from a mobile station.

TABLE 5

| Field | Length (bits) |
|---|---|
| QUAL_INFO_TYPE | 8 |
| QUAL_INFO_LEN | 3 |
| Type-specific fields | 8 × QUAL_INFO_LEN |
| NUM_INFO_RECORDS | 4 |

NUM_INFO_RECORDS occurrences of the following record:

| {( NUM_INFO_RECORDS) |   |
|---|---|
| RECORDED_TYPE | 8 |
| RECORD_LEN | 8 |
| Type_specific_fields | 8 × RECORDED_LEN |
| } (NUM_FIELDS) |   |

In the above messages, a field RECORD_TYPE is used for a base station to decide what kind of information will be requested via each of the messages or for a mobile station to decide what will be sent in response. Hence, the corresponding extended code values are delivered via fields RECORD_TYPE of the status request and response messages of the base station and the mobile station, respectively. Moreover, the extended code-value can be delivered via 'Type-specific_fields' of the status response message of the mobile station.

Table 6 shows definition of RECORD_TYPE in part.

TABLE 6

| Information Record | Record Type (binary) | QUAL_INFO TYPE (binary) | Message Type | r-csch | r-dsch | P_REV_IN_USE |
|---|---|---|---|---|---|---|
| Signaling Message Integrity capability | 00100100 | 00000000 | Status[2] | Y | Y | ≧10 |
| UIM_ID | 00100101 | 00000000 | Status[2] | Y | Y | ≧9 |
| ESN_ME | 00100110 | 00000000 | Status[2] | Y | Y | ≧9 |
| Reserved | 00100111 | — | — | — | — | — |
| Extended Key Facility | 00101010 | — | Flash | N | Y | ≧9 |
| Reserved | 00101001 |   |   |   |   |   |
| Extended ESN | 00101010 | 00000000 | Status[2] | Y | Y | All |
| Extended Record Type_International | 11111110 | — | Country-Specific |   |   | 1, ≧10 |

In Table 6, 'Flash' indicates a flash having an information message or an extended flash having an information message. "Information Record" can be included in a status request message (STRQM), a status response message (STRPM) or an extended status response message (ESTRPM). Hence, in the present invention, if a base station requests a transmission of an extended code value via STRQM by including the extended code value in RECORD_TYPE, a mobile station reports the corresponding extended 4-code value to the base station via STRPM or ESTRPM so that the base station can recognize PLCM using the reported extended code value.

Meanwhile, after a manufacturer code of a mobile station unique number has been re-allocated to a mobile station, a re-allocation type (RECYCLED_TYPE) for several re-allocations is notified to the mobile station. After having newly set an SCM according to the re-allocation type (RECYCLED_TYPE), the mobile station can generate a PLCM not to collide with conventional long code masks according to a corresponding value.

For this, the present invention uses a method that an association (TIA) having an authorization of allocating manufacturer codes of mobile station unique numbers re-allocates a manufacturer code of a mobile station unique number in case that the mobile station unique numbers are exhausted. Preferably, in re-allocating the manufacturer code, by preferentially re-allocating the manufacturer code having been preferentially previously allocated, it is able to avoid overlapping of the manufacturer code between mobile stations.

And, the present invention proposes that the re-allocation type (RECYCLED_TYPE), which is a value informing the order of the reallocation, shall be notified to a mobile station in manufacturer code re-allocation for the several re-allocations. In case of a first re-allocation, the re-allocation type (RECYCLED_TYPE) is set to RECYCLED_TYPE1. In case of a second re-allocation, the re-allocation type (RECYCLED_TYPE) is set to RECYCLED_TYPE2. Thus, the re-allocation type (RECYCLED_TYPE) is sequentially set. The re-allocation type (RECYCLED_TYPE) granted to the mobile station by the TIA may be a value that is directly stored in the mobile station or may be a value that is not transmitted to a base station by the mobile station.

Table 7 is provided to show a mapping relation between a station class mark (hereinafter abbreviated 'SCM') and PLCM according to seven kinds of re-allocation types (RECYCLED_TYPE).

TABLE 7

| RECYCLED_TYPE | SCM (Bit 4, Bit 3, Bit 1-Bit 0) | P36~P32 |
|---|---|---|
| 1 | 1100 | 01000 |
|   | 1101 |   |
|   | 1110 |   |
| 2 | 0000 | 01001 |
|   | 0011 |   |
|   | 0010 |   |
| 3 | 0111 | 01010 |
| 4 | 1000 | 01011 |
|   | 1001 |   |
|   | 1010 |   |
| 5 | 1111 | 01100 |
| 6 | 0011 | 01101 |
| 7 | 1011 | 01110 |

Referring to Table 7, in case that seven re-allocations are available, a mobile station sets values of $4^{th}$, $3^{rd}$, $1^{st}$ and $0^{th}$ bit values of an SCM according to the granted re-allocation type (RECYCLED_TYPE) and stores a corresponding SCMp in its permanent memory.

The SCMp stored in the mobile station is transmitted to a base station via a registration message, origination message or page response message without a request from the base station or can be transmitted to a base station via a mobile station information message such as a status message, status response message and extended status response message to a base station according to a request from the base station.

Table 8 shows an example of an 8-bit SCM for reporting a presence or non-presence of implementing a mobile station of a re-allocation mobile station unique number and a re-allocation type (RECYCLED_TYPE) implementation to a base station in case that seven re-allocations are available.

TABLE 8

| Function | Bit(s) | Setting |
|---|---|---|
| Extended SCM Indicator | 7 | Band Classes 1, 4: 1xxxxxxx |
|   |   | Other Bands: 0xxxxxxx |
| Dual Mode | 6 | CDMA Only: x0xxxxxx |
|   |   | Dual Mode: x1xxxxxx |
| Slotted Class | 5 | Non-Slotted: xx0xxxxx |
|   |   | Slotted: xx1xxxxx |
| IS-54 Power Class | 4 | RECYCLED1: xxx1xxxx |
|   |   | Others: xxxx1xxx |
| 25 MHz Bandwidth | 3 | RECYCLED2: xxxx0xxx |
|   |   | Others: xxxx1xxx |
| Transmission | 2 | Continuous: xxxxx0xx |
|   |   | Discontinuous: xxxxx1xx |

TABLE 8-continued

| Function | Bit(s) | Setting |
|---|---|---|
| Power Class for Band Class 0 Analog Operation | 1-0 | Class I: xxxxxx00 |
|   |   | Class II: xxxxxx01 |
|   |   | Class III: xxxxxx10 |
|   |   | RECYCLED3: xxxxxx11 |

Like the example shown in Table 8, by setting $4^{th}$, $3^{rd}$ and $1^{st}$-$0^{th}$ bits to values in Table 8, respectively, it is able to inform a base station of a presence or non-presence of a mobile station of a re-allocation mobile station unique number and a re-allocation type (RECYCLED_TYPE).

Table 9 shows an example of an 8-bit SCM for reporting a presence or non-presence of implementing a mobile station of a re-allocation mobile station unique number and a re-allocation type (RECYCLED_TYPE) implementation to a base station in case that three re-allocations are available.

TABLE 9

| RECYCLED_TYPE | SCM (Bit 4, Bit 3) | P36~P32 |
|---|---|---|
| 1 | 11 | 01000 |
| 2 | 00 | 01001 |
| 3 | 10 | 01010 |

In case that three reallocations are available, values of $4^{th}$ and $3^{rd}$ bits of SCM are set according to the granted re-allocation type (RECYCLED_TYPE). And, the corresponding SCMp is stored in a permanent memory.

Table 10 shows an example of an 8-bit SCM for reporting a presence or non-presence of implementing a mobile station of a re-allocation mobile station unique number and a re-allocation type (RECYCLED_TYPE) implementation to a base station in case that three re-allocations are available.

TABLE 10

| Function | Bit(s) | Setting |
|---|---|---|
| Extended SCM Indicator | 7 | Band Classes 1, 4: 1xxxxxxx |
|   |   | Other Bands: 0xxxxxxx |
| Dual Mode | 6 | CDMA Only: x0xxxxxx |
|   |   | Dual Mode: x1xxxxxx |
| Slotted Class | 5 | Non-Slotted: xx0xxxxx |
|   |   | Slotted: xx1xxxxx |
| IS-54 Power Class | 4 | RECYCLED1: xxx1xxxx |
|   |   | Others: xxxx1xxx |
| 25 MHz Bandwidth | 3 | RECYCLED2: xxxx0xxx |
|   |   | Others: xxxx1xxx |
| Transmission | 2 | Continuous: xxxxx0xx |
|   |   | Discontinuous: xxxxx1xx |
| Power Class for Band Class 0 Analog Operation | 1-0 | Class I: xxxxxx00 |
|   |   | Class II: xxxxxx01 |
|   |   | Class III: xxxxxx10 |
|   |   | Reserved: xxxxxx11 |

Like the example shown in Table 10, by setting $4^{th}$ and $3^{rd}$ bits to values, it is able to inform a base station of a presence or non-presence of a mobile station of a re-allocation mobile station unique number and a re-allocation type (RECYCLED_TYPE).

Table 11 shows an example of a mapping relation between RECYCLED_TYPE, SCM and PLCM (P36~P32).

TABLE 11

| RECYCLED_TYPE | SCM (Bit 4, Bit 3) | P36~P32 |
|---|---|---|
| 1 | 0000 | 01000 |
| 2 | 0001 | 01001 |
| 3 | 0010 | 01010 |
| 4 | 0011 | 01011 |
| 5 | 0111 | 01100 |
| 6 | 1000 | 01101 |
| 7 | 1001 | 01110 |
| 8 | 1010 | 01111 |
| 9 | 1011 | 10000 |
| 10 | 1100 | 10001 |
| 11 | 1101 | 10010 |
| 12 | 1110 | 10011 |
| 13 | 1111 | 10100 |

Like the example shown in Table 7, in case that thirteen re-allocations are available, a mobile station sets values of $4^{th}$, $3^{rd}$ and $1^{st}$-$0^{th}$ bit values of an SCM according to the granted re-allocation type (RECYCLED_TYPE) and stores a corresponding SCMp in its permanent memory. And, the stored SCMp is transmitted to a base station via a registration message, origination message or page response message without a request from the base station or is transmitted to a base station via a mobile station information message such as a status message, status response message and extended status response message to a base station according to a request from the base station.

Table 12 shows an example of an 8-bit SCM for reporting a presence or non-presence of implementing a mobile station of a re-allocation mobile station unique number and a re-allocation type (RECYCLED_TYPE) implementation to a base station in case that thirteen re-allocations are available.

TABLE 12

| Function | Bit(s) | Setting |
|---|---|---|
| Extended SCM Indicator | 7 | Band Classes 1, 4: 1xxxxxxx<br>Other Bands: 0xxxxxxx |
| Dual Mode | 6 | CDMA Only: x0xxxxxx<br>Dual Mode: x1xxxxxx |
| Slotted Class | 5 | Non-Slotted: xx0xxxxx<br>Slotted: xx1xxxxx |
| IS-54 Power Class | 4 | RECYCLED1: xxx1xxxx<br>Others: xxxx1xxx |
| 25 MHz Bandwidth | 3 | RECYCLED2: xxxx0xxx<br>Others: xxxx1xxx |
| Transmission | 2 | Continuous: xxxxx0xx<br>Discontinuous: xxxxx1xx |
| Power Class for Band Class 0 Analog Operation | 1-0 | RECYCLED3: xxxxxxxx |

Like the example shown in Table 12, by setting $4^{th}$, $3^{rd}$ and $1^{st}$-$0^{th}$ bits to values in Table 12, respectively, a mobile station can inform a base station whether the base station itself corresponds to a mobile station implementing a re-allocation mobile station unique number can inform the base station of a real re-allocation type (RECYCLED_TYPE). Meanwhile, the 'Power Class for Band Class 0 Analog Operation' information informed using the $1^{st}$-$0^{th}$ bits can be determined by a value previously set between the mobile station and provider.

It is able to generate a PLCM using the re-allocated mobile station unique number and the re-allocation type (RECYCLED_TYPE). For this, a 5-bit part (P36~P32) of a 42-bit (P0~P41) PLCM can be set to values avoiding colliding with all long code masks that are currently used using a mapping table between an SCM according to the re-allocation type (RECYCLED_TYPE) and the PLCM (P36~P32). Namely, in the present invention, according to the SCM by the re-allocation type (RECYCLED_TYPE), patterns of the 5-bit part (P36~P32) are searched for a pattern that is not currently used and the found pattern is then used.

FIG. 4 is a structural diagram of a PLCM generated using a mapping relation between an SCM, reallocation type and PLCM shown in Table 7, Table 9 and Table 11, respectively according to one embodiment of the present invention.

Referring to FIG. 4, by generating a PLCM after defining a unique number re-allocation and a re-allocation type (RECYCLED_TYPE) in case that a 32-bit ESN is exhausted, it is able to allocate an additional ESN without PLCM collision.

Table 13 shows an example of messages transmitted via forward-common signaling channel (hereinafter abbreviated 'F-CSCH').

TABLE 13

| Message Name | MSG_TAG | MSG_ID | Logical Channel |
|---|---|---|---|
| System Parameters Message | SPM | 000001 | Broadcast |
| Access Parameters Message | APM | 000010 | Broadcast |
| Neighbor List Message | NLM | 000011 | Broadcast |
| CDMA Channel List | CCLM | 000100 | Broadcast |
| Order Message | ORDM | 000111 | General signaling |
| Channel Assignment Message | CAM | 001000 | General signaling |
| Data Burst Message | DBM | 001001 | General signaling or broadcast |
| Authentication Challenge Message | AUCM | 001010 | General signaling |
| SSD Update Message | SSDUM | 001011 | General signaling |
| Feature Notification Message | FNM | 001100 | General signaling |
| Extended System Parameters Message | ESPM | 001101 | Broadcast |
| Extended Neighbor List Message | ENLM | 001110 | Broadcast |
| Status Request Message | STRQM | 001111 | General signaling |
| Service Redirection Message | SRDM | 010000 | General signaling |
| General Page Message | GPM | 010001 | General signaling |
| Global Service Redirection Message | GSRDM | 010010 | Broadcast |
| TMSI Assignment Message | TASM | 010011 | General signaling |
| PACA Message | PACAM | 010100 | General signaling |
| Extended Channel Assignment Message | ECAM | 010101 | General signaling |
| General Neighbor List Message | GNLM | 010110 | Broadcast |
| User Zone identification Message | UZIM | 010111 | Broadcast |
| Private Neighbor List Message | PNLM | 011000 | Broadcast |
| Reserved | N/A | 011001 | N/A |
| Extended Global Service Redirection Message | EGSRDM | 011010 | Broadcast |
| Extended CDMA Channel List Message | ECCLM | 011011 | Broadcast |
| Sync Channel Message | SCHM | 000001 | sync |

In Table 13, each message can be identified using MSG_ID. The MSG_ID of an ECAM (extended channel assignment message) used in assigning a channel according to a related art is '010101'. When a base station having implemented the re-allocation unique number and the re-allocation type (RECYCLED_TYPE) transmits the ECAM to a mobile station having implemented the re-allocation unique number and the re-allocation type (RECYCLED_TYPE), the base station sets the MSG_ID to a conventional reserved MSG_ID instead of setting the MSG_ID to '010101' so that the corresponding mobile station can recognize whether the re-allocation unique number and re-allocation type (RECYCLED_TYPE) of the base station are implemented.

Hence, in generating a PLCM, the corresponding mobile station uses a value acquired from a mapping table for P36~P32 of the PLCM if the MSG_ID of the ECAM is set to the conventional reserved value instead of '010101'.

Table 14 shows an example of messages transmitted via forward-dedicated signaling channel (hereinafter abbreviated 'F-DSCH').

TABLE 14

| Message Name | MSG_TAG | MSG_TYPE (binary) |
|---|---|---|
| Power Up Function Message | PUFM | 00011101 |
| Power Up Function Completion Message | PUFCM | 00011110 |
| General Handoff Direction Message | GHDM | 00011111 |
| Resource Allocation Message | RAM | 00100000 |
| Extended Release Message | ERM | 00100001 |
| Universal Handoff Direction Message | UHDM | 00100010 |
| Extended Supplement Channel Assignment Message | ESCAM | 00100011 |
| Mobile Assisted Burst Operation Parameters Message | MABOPM | 00100100 |
| User Zone Reject Message | UZRM | 00100101 |
| User Zone Update Message | UZUM | 00100110 |
| Call Assignment Message | CLAM | 00100111 |
| Extended Alert With Information Message | EAWIM | 00101000 |
| DS-41 Inter-system Transfer Message (DS-41 only, see [13]) | D41ISTM | 00101001 |
| Extended Flash With Information Message | EFWIM | 00101010 |
| Security More Command Message | SMCM | 00101011 |
| MC-MAP L3 Message (MC-MAP only, see [14]) | MAPIL3M | 00101100 |
| MC-MAP Inter-system Handover Command Message (MC-MAP only, see [14]) | MAPISHCM | 00101101 |
| MC-MAP Dedicated Mode Paging Message (MC-MAP only, see [14]) | MAPDMPM | 00101110 |
| R-TMSI Assignment Message (MC-MAP only, see [14]) | RTASM | 00101111 |
| MC-MAP Flow Release Message (MC-MAP only, see [14]) | MAPFRM | 00110000 |
| Base Station Status Response Message | BSSRSPM | 00110001 |

GHDM or UHDM in Table 14 is a message that is used by a current source base station to inform a mobile station of information of a target base station in carrying out handoff. In case of GHDM, MSG_TYPE is '00011111'. In case of UHDM, MSG_TYPE is '00100010'. In the present proposal, when the base station having implemented the re-allocation unique number and the re-allocation type (RECYCLED_TYPE) transmits the GHDM or UHDM to the mobile station having implemented the re-allocation unique number and the re-allocation type (RECYCLED_TYPE), the base station enables the mobile station in performing handoff to know a presence or non-presence of implementation of the target base station in a manner of setting the MSG_ID to a previously-unused reserved MSG_TYPE instead of setting the MSG_ID to '00011111' or '00100010'.

Hence, if the MSG_TYPE of the GHDM or UHDM is set to the reserved value instead of being set to '00011111' or '00100010', the corresponding mobile station sets P36~P32 to values read from the mapping table, respectively in generating the PLCM from the target base station after completion of the handoff.

Meanwhile, a system may need a mobile station identifier (hereinafter abbreviated 'MSID') having a unique value for each mobile station as well as the PLCM generation. Namely, in deciding whether a mobile station is valid or in demanding payment, a unique value needs to be granted to each mobile station. For this, the mobile station identifier (MSID) needs to be generated using an SCM and a mobile station serial number.

FIG. 5 is a structural diagram of a mobile station identifier (MSID) generated using an SCM and ESN.

Referring to FIG. 5, an ESN may correspond to either an originally allocated ESN or a re-allocated (recycled) ESN proposed by the present invention according to a value of SCM.

Table 15 shows an example of a mapping table of MSID_TYPE according to SCM and ESN in case of seven re-allocations are available.

TABLE 15

| SCM (Bit 4, Bit 3, Bit 1-Bit 0) | ESN | MSID_TYPE |
|---|---|---|
| 1100 | Recycled ESN | 001 |
| 1101 | | |
| 1110 | | |
| 0000 | Recycled ESN | 001 |
| 0001 | | |
| 0010 | | |
| 0111 | Recycled ESN | 011 |
| 1000 | Recycled ESN | 100 |
| 1001 | | |
| 1010 | | |
| 1111 | Recycled ESN | 101 |
| 0011 | Recycled ESN | 110 |
| 1011 | Recycled ESN | 111 |
| Others | Original ESN | 000 |

Referring to Table 15, the ESN in case of using the SCM shown in Table 7 means a recycled ESN. And, the ESN in case of using SCM not shown in Table 7 means an original ESN. And, a value of MSID_TYPE used in FIG. 5 is determined according to the SCM. And, the MSID_TYPE has a 3-bit length.

Table 16 shows an example of a mapping table of MSID_TYPE according to SCM and ESN in case that three re-allocations are available.

TABLE 16

| SCM (Bit 4, Bit 3) | ESN | MSID_TYPE |
|---|---|---|
| 11 | Recycled ESN | 01 |
| 00 | Recycled ESN | 10 |
| 10 | Recycled ESN | 11 |
| 01 | Original ESN | 00 |

In Table 16, a mapping table of MSID_TYPE according to SCM and ESN in case of three available re-allocations is shown.

Referring to Table 16, the ESN in case of using the SCM shown in Table 9 means a recycled ESN proposed by the present invention. And, the ESN in case of using SCM not shown in Table 9 means an original ESN. And, a value of MSID_TYPE used in FIG. 5 is determined according to the SCM and ESN. In this case, the MSID_TYPE has a 2-bit length.

Table 17 shows an example of a mapping table of MSID_TYPE according to SCM and ESN in case that thirteen re-allocations are available.

TABLE 17

| SCM (Bit 4, Bit 3, Bit 1-Bit 0) | ESN | MSID_TYPE |
|---|---|---|
| 0000 | Recycled ESN | 0001 |
| 0001 | Recycled ESN | 0010 |
| 0010 | Recycled ESN | 0011 |
| 0011 | Recycled ESN | 0100 |
| 0111 | Recycled ESN | 0101 |
| 1000 | Recycled ESN | 0110 |
| 1001 | Recycled ESN | 0111 |
| 1010 | Recycled ESN | 1000 |
| 1011 | Recycled ESN | 1001 |
| 1100 | Recycled ESN | 1010 |
| 1101 | Recycled ESN | 1011 |
| 1110 | Recycled ESN | 1100 |
| 1111 | Recycled ESN | 1101 |
| Others | Original ESN | 0000 |

Referring to Table 17, the ESN in case of using the SCM shown in Table 11 means a recycled ESN proposed by the present invention. And, the ESN in case of using SCM not shown in Table 11 means an original ESN. And, a value of MSID_TYPE used in FIG. 5 is determined according to the SCM and ESN. In this case, the MSID_TYPE has a 4-bit length.

Once the mobile station identifier (MSID) is determined, all mobile stations can have unique MSIDs, respectively. Hence, the system can use the MSID for the validity decision and billing of the mobile station. Although the ESN case is explained as one embodiment of the present invention, the ESN can be replaced by UIN_ID.

INDUSTRIAL APPLICABILITY

Accordingly, the present invention is applicable to the allocation of the unique number of the mobile communication terminal and to the generation of the PLCM using the allocated unique number of the mobile communication terminal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of allocating a mobile station unique number, comprising the steps of:
   re-allocating a manufacturer code of the mobile station unique number to a mobile station; and
   transmitting to the mobile station re-allocation type (RECYCLED_TYPE) information indicating how many times the re-allocating step is carried out.

2. The method of claim 1, wherein the mobile station generates a public long code mask (PLCM) using the re-allocated mobile station unique number and the re-allocation type.

3. The method of claim 1, wherein the mobile station unique number is either an electronic serial number (ESN) or a user identification module ID (UIM_ID).

4. The method of claim 1, wherein the re-allocation type has one fixed value.

5. The method of claim 1, wherein the mobile station stores a station class mark corresponding to the re-allocation type and a 5-bit part of a public long code mask (PLCM) in a form of a table.

6. The method of claim 5, wherein the mobile station determines the 5-bit part of the public long code mask (PLCM) according to the re-allocation type.

7. The method of claim 6, wherein the mobile station sets the 5-bit part to a value avoiding colliding with all long code masks that are currently used.

8. A method of operating a mobile station unique number, comprising the steps of:
   re-allocating a manufacturer code of the mobile station unique number to a mobile station;
   notifying to the mobile station a re-allocation type (RECYCLED_TYPE) indicating how many times the re-allocating step is carried out; and
   determining a value of a station class mark (SCM) for storing the mobile station according to the re-allocation type (RECYCLED_TYPE).

9. The method of claim 8, wherein the mobile station unique number is either an electronic serial number (ESN) or a user identification module ID (UIM_ID).

10. The method of claim 8, wherein the mobile station stores information indicating whether the mobile station itself implements a re-allocated mobile station unique number and re-allocation type (RECYCLED_TYPE) information in a permanent memory.

11. The method of claim 8, further comprising notifying a base station of the SCM including information indicating whether the mobile station itself implements a re-allocated mobile station unique number and re-allocation type (RECYCLED_TYPE) information.

12. The method of claim 11, wherein:
   the SCM is delivered to the base station via a registration message, origination message, page response message or terminal information message without a request from the base station; and
   the SCM is set to a previously reserved value according to the re-allocation type.

13. The method of claim 11, wherein the station class mark is delivered to the base station via one selected from the group consisting of a status message, a status response message, an extended status response message and a terminal information message according to a request from the base station.

14. The method of claim 1, wherein transmitting the re-allocation type information comprises setting a MSG_ID of a message to a reserved MSG_ID in order to notify the mobile station that a base station itself has implemented the re-allocation of the manufacturer code and the re-allocation type information, wherein the message is a message for informing a channel assignment or a message informing other information and further comprising
   generating, by the mobile station, a public long code mask (PLCM) by checking the MSG_ID.

15. The method of claim 14, wherein:
   the message for informing the channel assignment is an Extended Channel Assignment Message (ECAM); and
   the message informing other information is either a General Handoff Direction Message (GHDM) or a Universal Handoff Direction Message (UHDM).

16. The method of claim 14, wherein if the MSG_ID is set to the reserved MSG_ID which was not previously used, the mobile station sets a 5-bit part of the PLCM to a value within a mapping table determined according to the re-allocation type message.

* * * * *